Sept. 16, 1969 R. F. SIVYER 3,467,950

DIGITAL STORAGE DEVICES WITH TUNABLE CAPACITATIVE ELEMENT FOR SUPPRESSION

Filed Aug. 17, 1965 2 Sheets-Sheet 1

United States Patent Office 3,467,950

Patented Sept. 16, 1969

3,467,950

DIGITAL STORAGE DEVICES WITH TURNABLE CAPACITATIVE ELEMENT FOR SUPPRESSION

Raymond Frank Sivyer, Sunbury-on-Thames, England, assignor to Electric & Musical Industries Limited, Hayes, Middlesex, England, a company of Great Britain Filed Aug. 17, 1965, Ser. No. 480,288

Claims priority, application Great Britain, Aug. 29, 1964, 35,470/64

Int. Cl. G11c *11/14*

U.S. Cl. 340—173 5 Claims

ABSTRACT OF THE DISCLOSURE

In a thin film magnetic store in which the storage elements are disposed in a plurality of different planes, it is usual to reduce inductive coupling between the digit and sense conductors, which are coupled to the storage elements in columns, by reversing the sense of either the digit or the sense conductors between adjacent planes. However it is difficult to achieve complete cancellation of inductive coupling by this means especially when the transit time for a pulse from one end of a digit conductor to the other is comparable with the duration of the pulse. In accordance with the invention, the residual inductive coupling between respective digit and sense conductors is substantialy nullified by providing projections from the digit and sense conductors which form balancing capacity between the respective digit and sense conductors.

Figure 1:
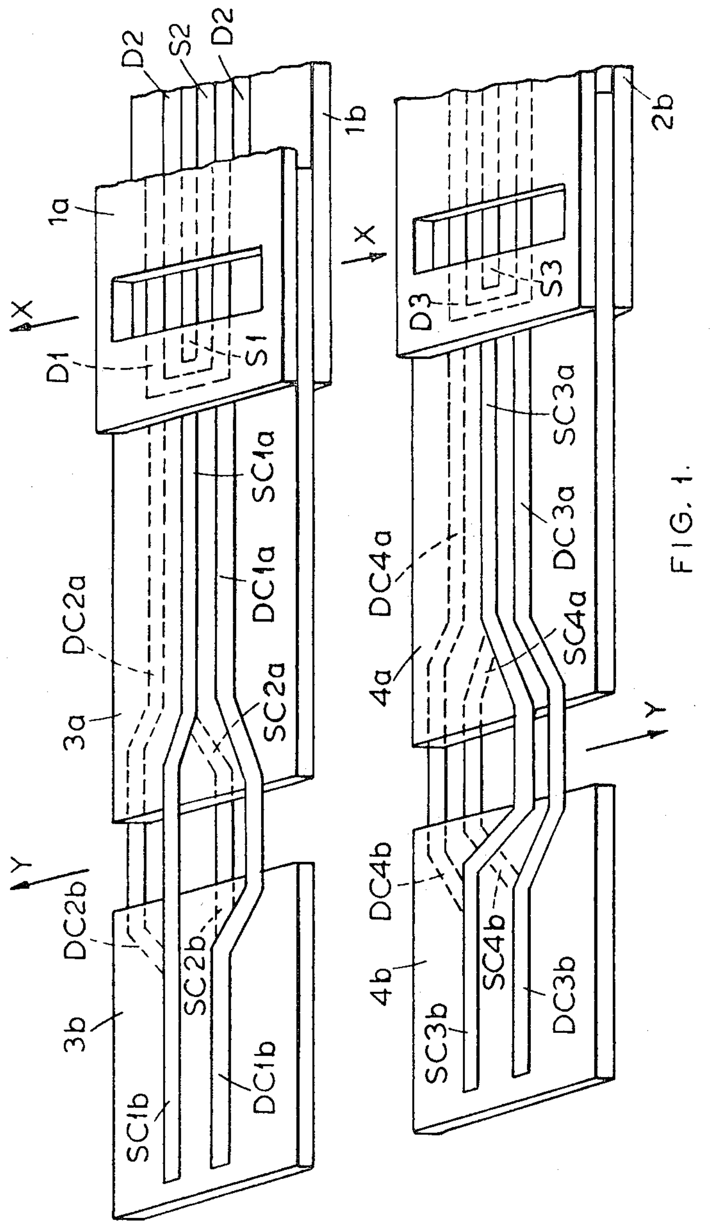

This invention relates to storage devices having a plurality of storage elements and is especially, although not exclusively applicable to thin film stores.

In a storage device having a matrix of thin magnetic film storage elements and sense and drive conductors coupled with said elements in groups, it has been found that coupling between sense and drive conductors causes spurious impulses to be set up in the sense conductors which may impede the sensing operation. In one form of store, called a word organised store, the storage elements are distributed in several planes and the drive conductors are constituted by a set of address conductors and a set of digit conductors, the address conductors and the digit conductors being perpendicular where they cross the planes of storage elements. The sense conductors are parallel to the digit conductors so that substantial mutual inductance and some capacitative coupling exists between the sense and digit conductors. In operation of such a store sensing is effected at the time of application of an address pulse to a selected address conductor which produces a rotation of the magnetisation vector of the elements in the selected row or "address" line, signals being subsequently applied to the digit conductors to influence the magnetic states of the elements in accordance with the respective digits. As the address conductors are disposed at right angles to the sense conductors there is no acute problem of coupling between these conductors, and it might be thought that any spurious signals induced in the sense conductors by the digit signals would not disturb the operation of the store since the sensing operation which is initiated by the address pulse is completed before the digit signals are applied. However, spurious energy induced in the sense conductors by the digit signals is large in amplitude compared with the wanted signals induced during sensing and paralyses the sense amplifiers for a period which extends for some time after the end of the digit signals so that a further sensing operation cannot be performed until the end of this period. Thus the interval between successive sensing operations has to be increased to include the period of paralysis of the sense amplifiers. It has been proposed to reduce this problem by so arranging the digit and sense conductors that a reverse loop occurs in the conductor of one set between adjacent planes of the store, and also by providing a variable inductance at one or other end of the digit or sense conductors of the store. Although these methods serve to reduce the overall mutual inductance between the sense and digit conductors which is the chief source of coupling, they may not reduce the coupling sufficiently, especialy when the transit time for a pulse from one end of the digit conductor to the other is comparable with the duration of the digit pulse. For example, the transit time may be about 30 nanoseconds and the digit pulse may be 300 nanoseconds, and the digit pulse or portions of it may induce in different parts of the sense conductors signals which are not mutually cancelling. For example, the leading and trailing parts of the pulse may induce spurious signals independently in different planes, which signals are liable to interfere with the next sensing operation. It has therefore been proposed to provide a plurality of trimming devices which are distributed throughout the store and which influence the mutual coupling between digit and sense conductors. This proposal has enabled the interval between successive sensing operations to be reduced by virtue of the fact that the mutual inductance is cancelled at spaced points throughout the store. However, the devices for influencing the mutual inductance which have been proposed hitherto have proved in practice to be rather difficult to adjust with the desired accuracy, and it is an object of the present invention to provide an improved device for adjusting the coupling between digit and sense conductors.

According to the present invention there is provided a storage device including:

(a) A first two dimensional array of storage elements,
(b) A second two dimensional array of storage elements,
(c) means for energising selected rows of said storage elements to condition them to accept signals for storage or to produce stored signals,
(d) Digit conductors for applying signals to be stored in said device, said digit conductors being common to the two arrays and coupled to said elements in columns,
(e) Sense conductors for deriving signals from said elements, said sense conductors being common to the two arrays and coupled to said elements in columns,
(f) One of the digit and sense conductors for every column being reversed in sense between the two arrays to produce substantial nullification of inductive coupling between the respective digit and sense conductors, and
(g) Projections from said digit and sense conductors forming capacity between the digit and sense conductors for every column to substantially nullify residual inductive coupling between the respective digit and sense conductors.

Figure 2A:
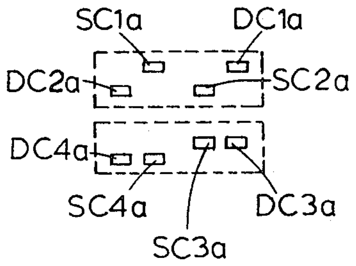
Figure 2B:
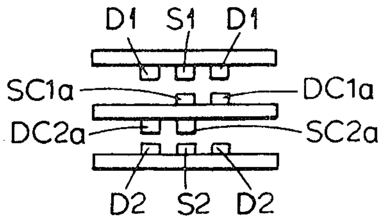
Figure 3:
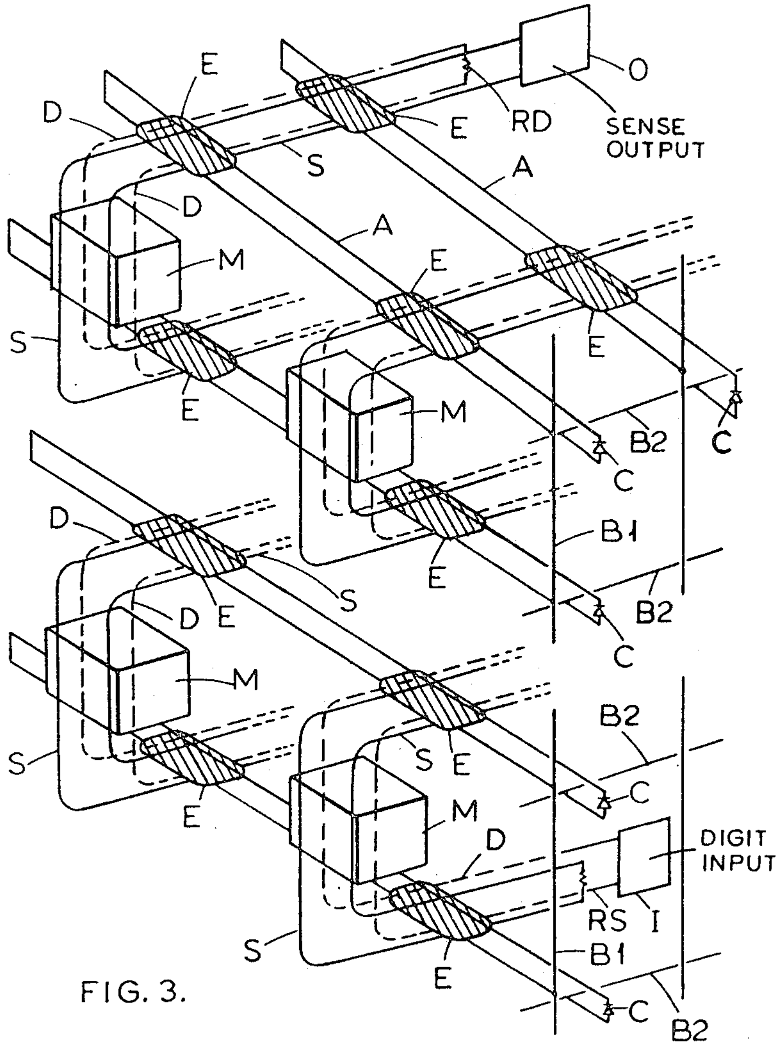

In order that the invention may be clearly understood and readily carried into effect, it will now be described with reference to the accompanying drawings, in which:

FIGURE 1 shows the interconnection of conductors associated with two memory planes of a thin film store, and a device for adjusting the capacitive between said conductors in accordance with one embodiment of the invention, FIGURE 2 is a sectional view of the interconnections of FIGURE 1, and FIGURE 3 is a phantom diagram showing the organisation of the conductors in four planes of a word organised thin film store.

A four plane store is described and shown for simplicity in FIGURE 3, but the store may have more than four planes, for example it may be a sixteen plane store. This figure gives an indication of the overall construction of the thin film word organised store to which the capacitive coupling device illustrated in FIGURE 1 may be applied. The store, assuming only four planes, comprises two hundred and fifty-six rows of thin magnetic film elements, sixty-four rows in each of four planes, and there are fifty elements in each row. In the drawing only four elements are shown in the uppermost plane, two in each of two rows, and only two elements in one row are shown in each of the remaining planes, the elements being denoted by the reference E. Each row of elements provides storage for one word and, the store being word organised, each row of magnetic elements is coupled with a separate address conductor A. Each address conductor A may be a two turn conductor although only one turn is shown in FIGURE 3 for simplicity, and one end of each address conductor A is coupled to a vertical bus-bar B1, each bus-bar B1 being common to two corresponding address conductors A of two planes. The other end of each address conductor A is coupled to a horizontal bus bar B2 via a diode C, there being two bus-bars B2 for each plane. There is a separate address winding A for every row on each plane and there are thirty-two vertical bus-bars B1 and four pairs of horizontal bus-bars B2. A particular row (word address) in any one plane can be selected by applying an appropriate potential difference between a selected vertical bus-bar B1 and a selected horizontal bus-bar B2. Any suitable address selecting circuit may of course be used.

Each of the elements E is also associated with two further conductors, namely a digit conductor D and a sense conductor S. These conductors are associated with the magnetic elements in columns and in the drawing sense conductors S are shown in full lines whilst digit conductors D are shown in broken lines to assist in discriminating between them. The same sense and digit conductors couple with corresponding elements E in the four planes. Thus there are fifty digit conductors D and fifty sense conductors S each of which zig-zags from one plane ot the next as can be seen from the drawing. The magnetic elements E are in the form of discrete thin magnetic film elements which are uniaxially anisotropic. They are roughly rectangular in shape having their longer dimensions aligned with the direction of the rows. The magnetic anisotropy is such as to produce a characteristic hysteresis loop which ideally approximates to a rectangle along axes which are aligned with the rows of the store, and substantially no hysteresis along axes aligned with columns. In practice each digit conductor D may be composed of two parallel conductors lying respectively on opposite sides of the conductor which constitutes the respective sense conductor S, but in order to simplify FIGURE 3 only one of the digit conductors is shown.

As can be seen in the drawing each sense and digit is in the form of a loop coupled respectively to means O for deriving a sense output and means I for applying a digit input. Each sense and digit conductor loop is terminated by a resistance respectively indicated by references RS and RD. Between the planes of each pair of planes of elements B1, the digit conductors D and sense conductors S are arranged so that a cross-over occurs in the respective positioning of these conductors. Thus as can be seen in the drawing each sense conductor is reversed looped so that each half loop lies above elements E on one of each pair of planes and below elements E on the other of the pair of planes whereas each digit conductor is arranged to lie above every element E in the first half of its loop and below every element in the second half of its loop or vice versa.

In accordance with an embodiment of this invention, at each cross-over position between the planes of each pair of planes of the store devices M are provided, shown diagrammatically as a block in each case, for adjusting the capacitive coupling between the digit and sense conductor in every pair of such conductors to compensate for the mutual inductance between the conductors. Although only a part of one side of the store is shown in FIGURE 3 it will be appreciated that the arrangement of conductors and devices M will be similar over the whole of that side of the store. On the other side of the store the sense conductors S are again reverse looped but no devices M are provided. Although in this embodiment devices M are provided for every pair of planes of the store, fewer devices M may be adequate to achieve the desired adjustment, and in some instances only a single device may be all that is required for each pair of conductors. A specific embodiment of the devices M will be described in greater detail hereinafter with reference to the other figures of the drawings.

The mode of operation of the storage device described is well known to those skilled in the art and will not be described in detail, the invention being primarily concerned with the provision of the devices M for compensating for the coupling between sense and digit conductors within the store.

A suitable form of the devices M is shown in FIGURE 1. This figures shows end connections at two adjacent memory planes of a multi-plane thin film store of the general construction described in connection with FIGURE 3. In this particular embodiment the digit and sense conductors of each plane are formed by printed conductors adherent on the facing surfaces of two supports, fragments of which are indicated. Address conductors are not visible in FIGURE 1, and the thin film storage elements are provided on a thin substrate which is also not visible but is sandwiched between said two supports. The supports of one plane bear the references 1*a* and 1*b* and the supports of the other plane bear the references 2*a* and 2*b*. Adherent on the lower surfaces of supports 1*a* and 2*a* are the digit and sense conductors D1, S1 and D3 and S3 respectively. As was mentioned with respect to FIGURE 3, each digit conductor, such as D1, comprises two parallel conductors which, as shown in the drawing, are connected together at the ends of the planes. Part of support 1*a* is cut away to show the digit and sense conductors D2 and S2 adherent on the upper surface of support 1*b* and similarly digit and sense conductors D4 and S4, not visible, are adherent on the upper surface of support 2*b*. The digit and sense conductors of adjacent planes are coupled together in the manner already described with reference to FIGURE 3 employing digit and sense connecting portions DC1 and SC1 printed on the upper surface of an insulated board 3, DC2 and SC2 printed on the under surface of board 3, DC3 and SC3 printed on the upper surface of an insulated board 4 and DC4 and SC4 printed on the lower surface of board 4. The right-hand ends of boards 3 and 4 are sandwiched between the left-hand ends of boards 1*a*, 1*b* and 2*a*, 2*b* respectively and corresponding conductors aligned vertically. As shown in the drawing, slots are cut in boards 1*a*, 1*b*, 2*a* and 2*b* and are bridged by the conductors adherent on these boards. Thus by applying a soldering iron to the slots, the conductors on boards 1*a*, 1*b*, 2*a* and 2*b* are connected to the vertically aligned conductors on boards 3 and 4. FIGURE 2*b* is a sectional view along the line X—X of the interconnections of boards 1*a*, 1*b* and 3, the conductors on boards 2*a*, 2*b* and 4 being similarly connected. Boards 3 and 4 comprise two parts 3*a*, 3*b* and 4*a*, 4*b* respectively, bridged by the digit and sense connecting conductors. Suitable methods of forming conductors which are partially unsupported are described in the aforesaid specification. The conductors bridging the gap between boards 3*a* and 3*b* are connected to the vertically aligned conductors bridging the gap between boards 4*a* and 4*b* by soldering along the line Y—Y. FIGURE 2*a* is a sectional view along the line Y—Y of these interconnections. It can be seen that these inter-connections provide the required cross-over in the respective positioning of the digit and sense conductors in the planes 1 and 2. For example sense conductor S1 which lies above the thin film elements in plane 1 is connected via conductors SC1*a* and SC4*a* to sense conductor S4 which lies below the thin film elements in plane 2, whereas digit conductor D1 which lies above the thin film elements in plane 1 is connected via conductors DC1*a* and DC3*a* to digit conductor D3 which lies above the thin film elements in plane 2.

The devices M indicated diagrammatically in FIGURE 3, comprise boards 3*b* and 4*b* with their adherent conductors. Referring to board 3*b*, conductors SC1*b* and DC1*b* on the upper surface are vertically aligned with conductors DC2*b* and SC2*b* respectively on the lower surface. Thus each pair of conductors SC1*b*, DC2*b* and DC1*b*, SC2*b* forms a capacitor effectively connected between conductors S1 and D2 and S2 and D1 respectively. Similarly conductors SC3*b*, DC4*b* and DC3*b*, SC4*b* form capacitors effectively connected between conductors S3, D4 and S4, D3 respectively. If all the conductors on boards 3*b* and 4*b* are of equal length, the four capacities will be equal. Furthermore, due to the cross-over in the respective positionings of the digit and sense conductors in planes 1 and 2, the signals set up in the sense conductors due to the capacities on board 3*b* will be equal and opposite to the signals set up in the sense conductors due to the capacities on board 4*b* when the digit conductors are energised, and will be mutually cancelling. As has been already mentioned, however, due to the mutual inductance between the digit and sense conductors, spurious signals will occur in the sense conductors. In accordance with the invention these spurious signals are cancelled to a high degree in each pair of adjacent planes by adjusting the capacitive coupling between digit and sense conductors in such a way that the compensating signals set up in the sense conductors due to the capacitive coupling between digit and sense conductors are equal is amplitude and opposite in polarity to the spurious signals set up in the sense conductors due to the mutual inductance between digit and sense conductors. For example, if the compensating signals set up in the sense conductors due to the capacities formed on board 3*b* are regarded as being positive and the compensating signals set up in the sense conductors due to the capacities formed on board 4*b* are regarded as being negative, then positive spurious signals set up in the sense conductors due to mutual inductance between digit and sense conductors may be cancelled by reducing the value of the capacitors on board 3*b*. This may be done by reducing the length of conductors SC1*b*, DC1*b*, SC2*b* and DC2*b*, for example by cutting pieces off the left-hand end of board 3*b* until the spurious signals are reduced to zero. Conversely, if the spurious signals due to mutual inductance are negative, they may be cancelled by cutting pieces off the left-hand end of board 4*b*.

In some cases, the remaining capacities may be undesirably large or the conductors on the planes arranged so that the spurious signals which are set up are of known polarity in the absence of cancellation. In a modification of the method of cancellation described above, the residual capacities of such a store may be reduced to a minimum as follows. If the spurious signals are positive, the board 3*b* and its associated conductors are completely removed from the store e.g. by cutting along the line Y—Y. The compensating signal will then be due solely to the capacities on board 4*b* and will be negative and, in general, greater in amplitude than the spurious signals. The resultant signals in the sense conductors will therefore be negative and may be reduced to zero by reducing the lengths of the conductors on board 4*b*. Similarly, in the case of negative spurious signals the board 4*b* and its associated conductors would be completely removed and the length of board 3*b* adjusted.

It will be appreciated that although only one set of digit, sense and interconnecting conductors is shown in the drawing, boards 1, 2, 3 and 4 would, in practice, have one set for each column of the store i.e. fifty sets in the case of the store described with reference to FIGURE 3. Furthermore, it may in some cases be possible to achieve adequate cancellation by adjusting only one of the four capacities instead of a pair, and it may be possible to achieve satisfactory results by forming only one capacity on each of the boards 3*b* and 4*b*.

Other methods of forming and adjusting the capacities will be apparent to those skilled in the art, and the invention is not limited to the particular embodiment described.

What I claim is:

1. A storage device including (a) a first two dimensional array of storage elements, (b) a second two dimensional array of storage elements, (c) means for energising selected rows of said storage elements to condition them to accept signals for storage or to produce stored signals, (d) digit conductors for applying signals to be stored in said device, said digit conductors being common to the two arrays and coupled to said elements in columns, (e) sense conductors for deriving signals from said elements, said sense conductors being common to the two arrays and coupled to said elements in columns, (f) one of the digit and sense conductors for every column being reversed in sense between the two arrays to produce substantial nullification of inductive coupling between the respective digit and sense conductors, (g) and projections from said digit and sense conductors forming capacity between the digit and sense conductors for every column to substantially nullify residual inductive coupling between the respective digit and sense conductors.

2. A storage device according to claim 1 wherein said digit and sense conductors provide residual inductive coupling of predetermined sense and said projections provide capacitive coupling in the opposite sense only.

3. A storage device according to claim 1 including, for every column of elements, one set of projections from the portions of the respective digit and sense conductors which couple with the elements in one of said arrays, and a second set of projections from the portions of the respective digit and sense conductors which couple with the elements in the other said array, the two sets of projections providing capacitive coupling of the respective digit and sense conductors of opposite senses.

4. A storage device according to claim 1 in which the size of said projection is individually adjusted for different columns.

5. A storage device according to claim 1 in which said projections are printed extensions of the digit and sense conductors.

References Cited

UNITED STATES PATENTS

| | | | |
|---|---|---|---|
| 3,389,385 | 6/1968 | Haentze | 340—174 |
| 3,391,397 | 7/1968 | Birt | 340—174 |
| 3,233,227 | 2/1966 | Petschaver | 340—173 |

TERRELL W. FEARS, Primary Examiner

U.S. Cl. X.R.

340—166, 174